(12) United States Patent
Kato et al.

(10) Patent No.: US 7,649,714 B2
(45) Date of Patent: Jan. 19, 2010

(54) HIGH RELIABILITY HEATER FOR FLYING HEIGHT CONTROL

(75) Inventors: Atsushi Kato, Kanagawa (JP); Masayuki Kurita, Kanagawa (JP); Koji Miyake, Kanagawa (JP); Toshiya Shiramatsu, Kanagawa-ken (JP); Hideaki Tanaka, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 522 days.

(21) Appl. No.: 11/201,569

(22) Filed: Aug. 10, 2005

(65) Prior Publication Data

US 2006/0034013 A1      Feb. 16, 2006

(30) Foreign Application Priority Data

Aug. 10, 2004      (JP)      .............................. 2004-233248

(51) Int. Cl.
*G11B 5/60*      (2006.01)
(52) U.S. Cl. ................................................... 360/234.4
(58) Field of Classification Search ............... 360/234.4
See application file for complete search history.

(56) References Cited

U.S. PATENT DOCUMENTS

| | | | | |
|---|---|---|---|---|
| 5,991,113 | A * | 11/1999 | Meyer et al. | .................. 360/75 |
| 7,068,468 | B2 * | 6/2006 | Kamijima | .................. 360/128 |
| 2002/0093772 | A1 | 7/2002 | Yoshida et al. | |
| 2003/0035237 | A1 * | 2/2003 | Lille | ....................... 360/77.07 |
| 2003/0099054 | A1 * | 5/2003 | Kamijima | .................... 360/59 |
| 2004/0027709 | A1 * | 2/2004 | Hamaguchi et al. | ........... 360/59 |
| 2004/0114268 | A1 * | 6/2004 | Satoh et al. | .................... 360/75 |
| 2004/0165305 | A1 * | 8/2004 | Nishiyama | .................... 360/75 |
| 2005/0024775 | A1 | 2/2005 | Kurita et al. | |
| 2005/0213250 | A1 * | 9/2005 | Kurita et al. | ............. 360/234.4 |

FOREIGN PATENT DOCUMENTS

| | | |
|---|---|---|
| JP | 63-063115 | 3/1988 |
| JP | 05-020635 A1 | 1/1993 |
| JP | 2003-051538 | 2/2003 |
| JP | 2003-168274 A1 | 6/2003 |
| JP | 2005-056447 | 3/2005 |

* cited by examiner

*Primary Examiner*—David D Davis
(74) *Attorney, Agent, or Firm*—Townsend and Townsend and Crew LLP; John Henkhaus

(57) ABSTRACT

Embodiments of the invention improve the power consumption and response speed of a heater for the gap flying height (hg) adjustment, to minimize an influence that the heater has on a life of a read element, and to provide a heater having resistance lines reduced in breaking and ensuring higher reliability. In one embodiment, a read/write element is formed near an air bearing surface (ABS) on a slider, and the circumference of the read/write element is filled with alumina. The read/write element includes an upper magnetic pole piece, a lower magnetic pole piece, a coil, and a resist filling around the coil, and a read element (MR) for performing reading, and an upper shield and lower shield for protecting the read element from an external magnetic field. A heater for adjusting the flying height is provided between the slider and the read/write element but near the read/write element. A temperature gradient relaxing material having a thermal conductivity higher than that of the heater and that of a material (alumina) filling around the heater is formed near the heater.

17 Claims, 8 Drawing Sheets

Distance between center of heater and air bearing surface 24, μm

Height of heater 21, μm

HIGH RELIABILITY HEATER FOR FLYING HEIGHT CONTROL

CROSS-REFERENCES TO RELATED APPLICATIONS

This application claims priority from Japanese Patent Application No. JP2004-233248, filed Aug. 10, 2004, the entire disclosure of which is incorporated herein by reference.

BACKGROUND OF THE INVENTION

The present invention relates to a magnetic head slider capable of adjusting a gap flying height, and a magnetic disk drive equipped with the magnetic head slider. In particular, the present invention relates to a construction of a magnetic head slider including a heater to adjust the gap flying height.

A magnetic disk drive includes a rotating magnetic disk and a magnetic head slider equipped with a read/write element and supported by a suspension. This slider reads and writes information on the magnetic disk while relatively flying over the magnetic disk. A distance between the magnetic disk and the magnetic head slider, namely, a slider flying height must be reduced in order to accomplish a high recording density of such a magnetic disk drive. In particular, a gap flying height (hg) which is a distance between the magnetic disk and the read/write element of the magnetic head slider must be narrowed. The gap flying height (hg) varies depending on the machining error of the magnetic head slider or the environment in use (e.g., temperature, atmospheric pressure, and the like). Reduction of this variation will allow the gap flying height (hg) to be narrowed.

Means for reducing the variation of the gap flying height (hg) accompanied by a machining error or an environment change is disclosed in Patent Document 1 (Japanese Patent Laid-open No. 5-20635). According to Patent Document 1, a thin film resistor is provided within a coil insulating layer of an inductive type thin film magnetic head and if necessary, and this thin film resistor is energized to allow an end of the magnetic pole piece to protrude due to thermal expansion. Patent Document 2 (Japanese Patent Laid-open No. 2003-168274) discloses that a heater is provided in a position opposite to an air bearing surface (ABS) of magnetic head elements.

BRIEF SUMMARY OF THE INVENTION

To adjust a gap flying height (hg) using a heater, a position where a heater is formed or the size of the heater is an important factor. As a result of extensive studies, the present inventors have found that by changing a size and shape of a heater for a magnetic head slider and a position where the heater is formed, a power consumption and a response speed of the flying height adjustment can be improved, and the influence which the heater has on the life of a read element can be minimized.

In order to minimize the power consumption of the heater, a gap flying height variation ($\Delta hg$) per unit power consumption of the heater must be increased. The response speed for the flying height adjustment is one of the important characteristics of a flying height adjustment-type magnetic head slider. The faster the response speed is, the more excellent the magnetic head slider is. When the heater is formed near a read element, the temperature rise of the read element occurs, which leads to a short life of the read element. Therefore, the temperature rise in the read element must be minimized.

A feature of the present invention is to provide a magnetic head slider in which the power consumption and response speed of the flying height(hg) adjustment are improved and a longer life of a read element is attained.

Another feature of the present invention is to provide a magnetic head slider in which a heating member for adjusting a gap flying height (hg) is improved in a performance as an actuator and a longer life of a read element is attained.

Yet another feature of the present invention is to provide a magnetic disk drive equipped with a magnetic head slider having a highly reliable heating member for adjusting a gap flying height (hg) of a read/write element with a high degree of accuracy.

In accordance with an aspect of the present invention, a magnetic head slider has a slider; a read/write element having a read element and a write element stacked on an element forming surface (air flowing-out end face) of the slider; and a heater provided between the slider and the read/write element through an insulating material such that a tip of the heater is located rearwardly of the read element of the read/write element.

In some embodiments, the heater is formed by alternately extending resistance lines on a surface parallel to the element forming surface (air flowing-out end face) of the slider.

In accordance with another aspect of the present invention, a magnetic head slider has a slider; a read/write element having a read element and a write element stacked on an element forming surface (air flowing-out end face) of the slider; a heater provided between the slider and the read/write element through an insulating material such that a tip of the heater is located rearwardly of the read element of the read/write element; and a film composed of a material having a thermal conductivity higher than that of the insulating material provided near the heater.

In some embodiments, the film is provided on either a lower part or upper part of the heater. The film may be provided on both surfaces of the heater. The film may be an insulator. It is desirable that the film has a coefficient of thermal expansion smaller than that of the insulating material and has a Young's modulus larger than that of the heater. A barrier layer composed of tungsten or titanium may be provided on at least one of the upper part and lower part of the heater.

In accordance with another aspect of the present invention, a magnetic head slider has a slider; a read/write element having a read element and a write element stacked on an element forming surface (air flowing-out end face) of the slider; and a heater provided between the slider and the read/write element through an insulating material, wherein resistance lines are alternately extended such that tips of the resistance lines are located rearwardly of the read element of the read/write element and such that a cross-sectional area in the central part of the resistance lines is larger than that in the peripheral part thereof.

In specific embodiments, a line width of the resistance lines is wider in the central part than in the peripheral part. A thickness of the resistance lines is larger in the central part than in the peripheral part.

In accordance with another aspect of the present invention, a magnetic head slider has a slider; a read/write element having a read element and a write element stacked on an element forming surface (air flowing-out end face) of the slider; and a heater provided between the slider and the read/write element through an insulating material, wherein resistance lines are alternately extended such that tips of the resistance lines are located rearwardly of the read element of the read/write element and such that a gap between the resistance lines is larger in the central part of the resistance lines than in the peripheral part.

In accordance with another aspect of the present invention, a magnetic head slider has a slider; a read/write element having a read element and a write element stacked on an element forming surface (air flowing-out end face) of the slider; and a heater provided between the slider and the read/write element through an insulating material, wherein resistance lines are alternately extended such that tips of the resistance lines are located rearwardly of the read element of the read/write element and such that contact with a part having the highest temperature is avoided.

In some embodiments, the resistance lines are wired on a part other than a central part of the heater. The resistance lines are wired on a part other than a central part of the heater and a part other than a vicinity of the read element.

In accordance with another aspect of the present invention, a magnetic disk drive has a magnetic disk; a spindle motor that rotates the magnetic disk while holding the magnetic disk on a rotating shaft; a magnetic head slider that reads and writes information on the magnetic disk; a suspension that supports the magnetic head slider; and a drive unit that moves the suspension in a radial direction of the magnetic disk. The magnetic head slider includes a slider; a read/write element having a read element and a write element stacked on an element forming surface (air flowing-out end face) of the slider; and a heater provided between the slider and the read/write element through an insulating material such that a tip of the heater is located rearwardly of the read element of the read/write element.

In accordance with another aspect of the present invention, a magnetic disk drive has a magnetic disk; a spindle motor that rotates the magnetic disk while holding it on a rotating shaft; a magnetic head slider that reads and writes information on the magnetic disk; a suspension that supports the magnetic head slider; and a drive unit that moves the suspension to a radial direction of the magnetic disk. The magnetic head slider includes a slider; a read/write element having a read element and a write element stacked on an element forming surface (air flowing-out end face) of the slider; a heater provided between the slider and the read/write element through an insulating material such that a tip of the heater is located rearwardly of the read element of the aid read/write element; and a film composed of a material having a thermal conductivity higher than that of the insulating material provided near the heater.

In accordance with another aspect of the present invention, a magnetic disk drive has a magnetic disk; a spindle motor that rotates the magnetic disk while holding it on a rotating shaft; a magnetic head slider that reads and writes information on the magnetic disk; a suspension that supports the magnetic head slider; and a drive unit that moves the suspension to a radial direction of the magnetic disk. The magnetic head slider includes a slider; a read/write element having a read element and a write element stacked on an element forming surface (air flowing-out end face) of the slider; and a heater provided between the slider and the read/write element through an insulating material. Resistance lines are alternately extended such that tips of the resistance lines are located rearwardly of the read element of the read/write element and such that a cross-sectional area in the central part of the resistance lines is larger than that in the peripheral part thereof.

In accordance with another aspect of the present invention, a magnetic disk drive has a magnetic disk; a spindle motor that rotates the magnetic disk while holding it on a rotating shaft; a magnetic head slider that reads and writes information on the magnetic disk; a suspension that supports the magnetic head slider; and a drive unit that moves the suspension to a radial direction of the magnetic disk. The magnetic head slider includes a slider; a read/write element having a read element and a write element stacked on an element forming surface (air flowing-out end face) of the slider; and a heater provided between the slider and the read/write element through an insulating material. Resistance lines are alternately extended such that tips of the resistance lines are located rearwardly of the read element of the read/write element and such that a gap between the resistance lines is larger in the central part of the resistance lines than in the peripheral part.

In accordance with another aspect of the present invention, a magnetic disk drive has a magnetic disk; a spindle motor that rotates the magnetic disk while holding it on a rotating shaft; a magnetic head slider that reads and writes information on the magnetic disk; a suspension that supports the magnetic head slider; and a drive unit that moves the suspension to a radial direction of the magnetic disk. The magnetic head slider includes a slider; a read/write element having a read element and a write element stacked on an element forming surface (air flowing-out end face) of the slider; and a heater provided between the slider and the read/write element through an insulating material. Resistance lines are alternately extended such that tips of the resistance lines are located rearwardly of the read element of the read/write element and such that contact with a part having the highest temperature is avoided.

According to the present invention, the heating member for adjusting a gap flying height (hg) can be improved in a performance as an actuator, and a longer life of a read element can be attained.

BRIEF DESCRIPTION OF THE DRAWINGS

FIG. 11 is a view showing a heater where a line width of resistance lines is changed at every turn of the lines, according to a third embodiment of the present invention.

FIG. 12 is a view showing a heater where a line width of resistance lines is changed at any time, according to a third embodiment of the present invention.

FIG. 13 is a view showing a heater where resistance lines are wired away from the vicinity of the heater central part, according to a fourth embodiment of the present invention.

FIG. 14 is a view showing a heater where resistance lines are wired away from the vicinity of the heater central part and the vicinity of a read element, according to a fourth embodiment of the present invention.

DETAILED DESCRIPTION OF THE INVENTION

Figure 15:
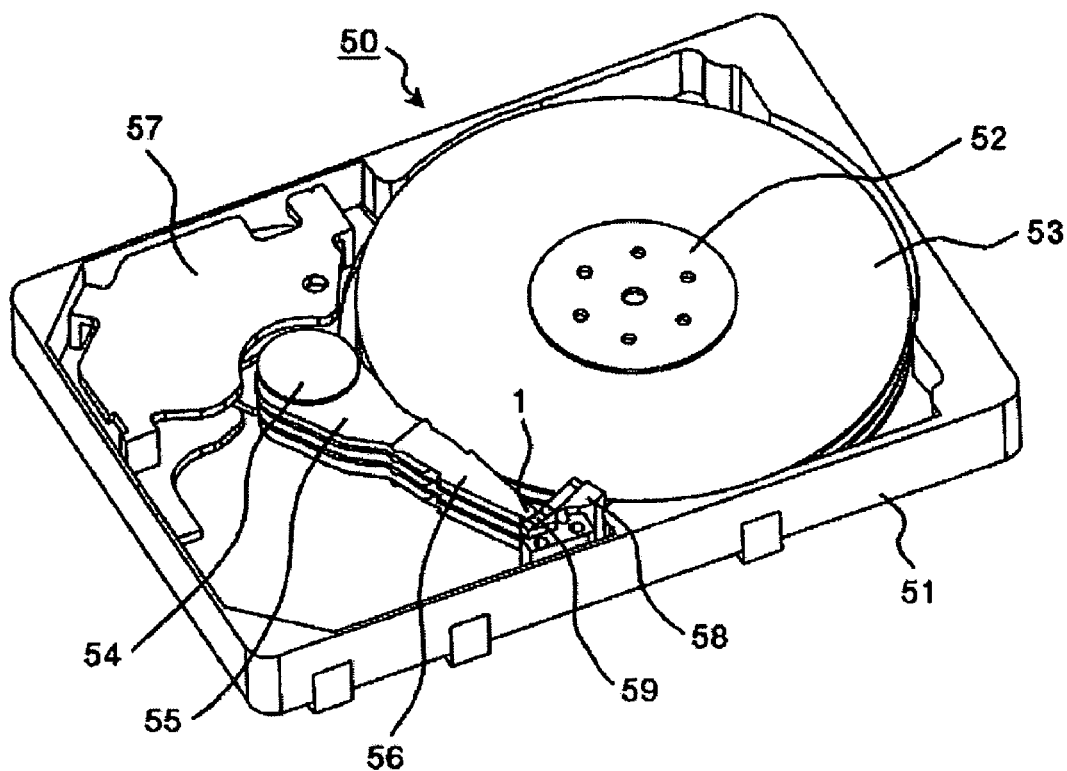
FIG. 15 is a schematic construction view of a magnetic disk drive equipped with a magnetic head slider.

FIG. 15 shows a construction of a magnetic disk drive 50 equipped with a magnetic head slider (hereinafter referred to as a slider) 1 according to each embodiment of the present invention. A magnetic disk 53 is installed and driven for rotation on a rotating shaft 52 of a spindle motor fixed to a base 51. An actuator arm 55 is supported with a pivot 54. A suspension 56 is attached to one end of the actuator arm 55, and a coil (not shown) constructing a voice coil motor 57 is attached to the other end. A drive unit is composed of the pivot 54, the actuator arm 55 and the voice coil motor 57. The magnetic head slider 1 is attached to a tip of the suspension 56. A ramp mechanism 58 is installed on the base 51 and located on the outer peripheral side of the magnetic disk 53. A slope on which a lift tab 59 rests at unloading of the magnetic head slider 1 is formed on the ramp mechanism 58.

When a coil of the voice coil motor 57 is energized, a rotary torque is developed in the actuator arm 55 to allow the suspension 56 attached to the actuator arm 55 to move to a radial direction of the magnetic disk 53. By this rotary motion, the magnetic head slider 1 attached to the tip of the suspension 56 is moved to an arbitrary position in the radial direction of the magnetic disk 53 to read and write information on the magnetic disk. When the magnetic head slider 1 is unloaded, the lift tab 59 is moved to rest on the slope of the ramp mechanism 58. When the magnetic head slider 1 is loaded, the slider 1 is loaded over a recording face of the magnetic disk 53 from a standby condition in the ramp mechanism 58.

Figure 16:
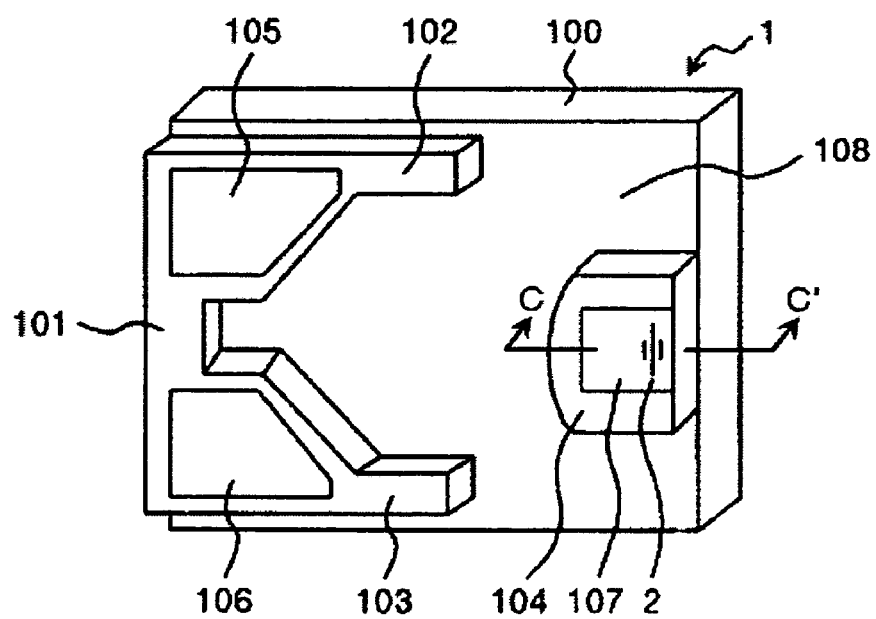
FIG. 16 is an outline view of a magnetic head slider.

FIG. 16 shows a construction viewed from the air bearing surface side of the magnetic head slider 1. In the magnetic head slider 1, a front bearing surface 101, side bearing surfaces 102 and 103, and a rear bearing surface 104 are formed on the surface serving as an air bearing surface (ABS) of the slider 100 by means of a processing technique such as ion milling. Rails 105 and 106 are formed on the front bearing surface 101 and the side bearing surfaces 102 and 103, and a rail 107 is formed on the rear bearing surface 104. A read/write element 2 of the magnetic head slider is exposed on the rail 107 surface. A negative pressure-producing deep groove 108 is formed between the front bearing surface 101, the side bearing surfaces 102 and 103, and the rear bearing surface 104. A protective film such as carbon is formed on each bearing surface and rail surface.

Internal Construction of Magnetic Head Slider According to First Embodiment

Figure 1:
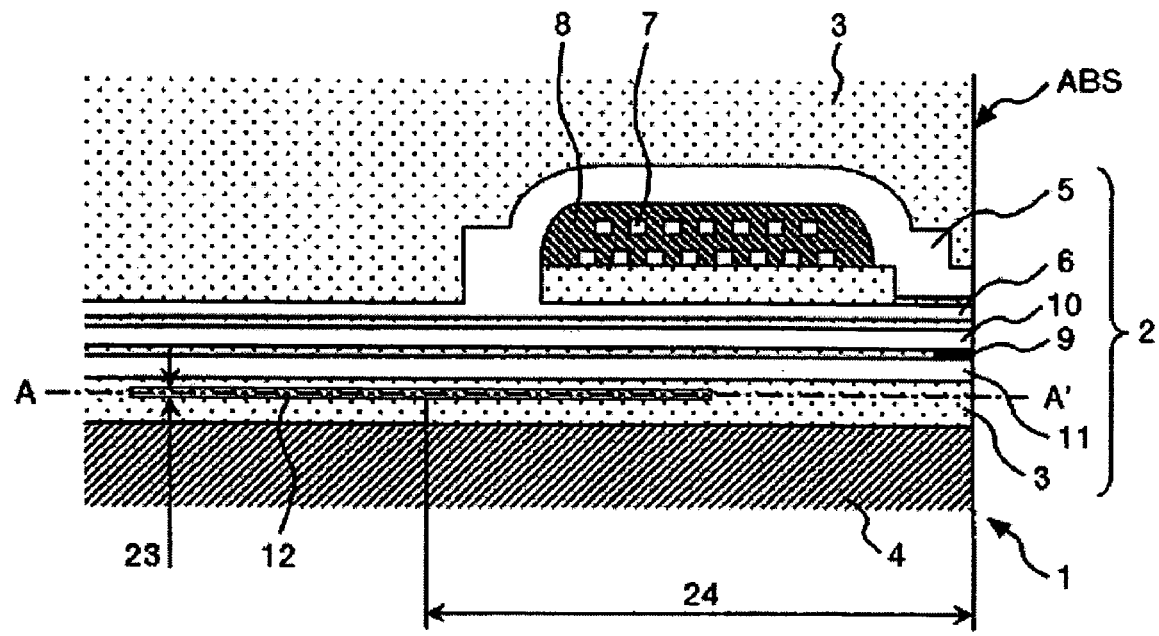
FIG. 1 is a cross-sectional view near a read/write element of a magnetic head slider according to a first embodiment of the present invention.
Figure 2:
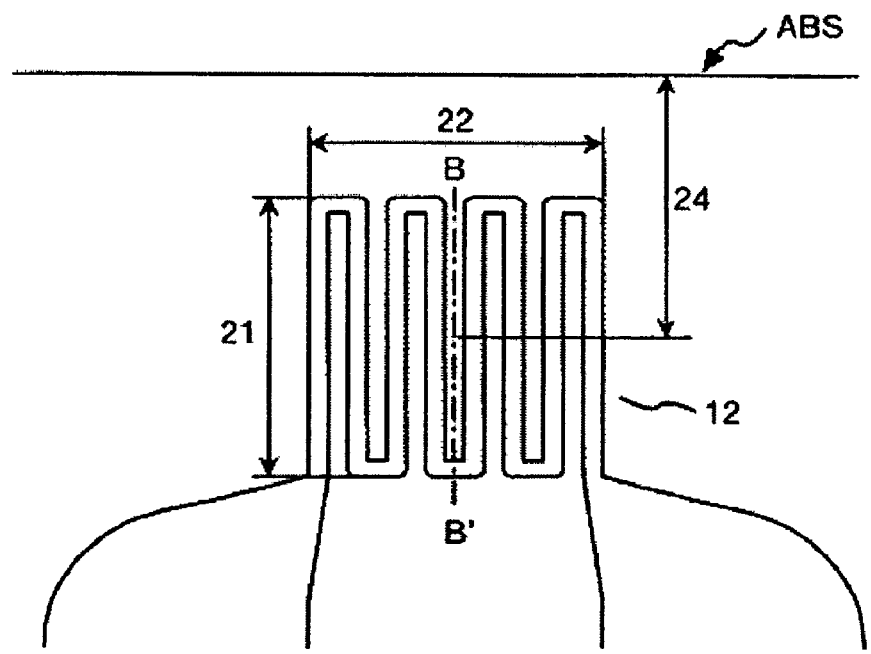
FIG. 2 is a cross-sectional view taken along the line A-A' in FIG. 1.

FIG. 1 is a cross-sectional view (equivalent to a cross-sectional view taken along the line C-C' in FIG. 16) near a read/write element, which is viewed from a slider side surface side, of a magnetic head slider 1 according to a first embodiment of the present invention. FIG. 2 is a cross-sectional view taken along the line A-A' of a heater 12, which is viewed from a slider air flowing-out end side. As shown in FIGS. 1 and 2, the read/write element 2 according to the present embodiment is formed near the air bearing surface (ABS) of an element forming surface (air flowing-out end face) of an Al—TiC slider 4, and the circumference of the read/write element 2 is filled with alumina 3 of an insulating material. The read/write element 2 is composed of a read head and a write element. The read head has a read element (MR) 9, and an upper shield 10 and lower shield 11 for protecting the read element 9 from an external magnetic field. The write element has an upper magnetic pole piece 5 and lower magnetic pole piece 6 stacked on the read head through an insulator, a coil 7 and a resist 8 of an insulating material filling around the coil 7. The heater 12 for adjusting a flying height is installed between the slider 4 and the read/write element 2 but near the read/write element 2.

The heater (resistor) 12 between the lower shield 11 and the slider 4 has a structure that resistance lines are alternately extended. A tip of the heater 12 is located rearwardly of the read element 9 (opposite to ABS). A size of the heater 12 is expressed such that the heater size in a thickness direction of the slider is a height 21, the heater size in a width direction of the slider is a width 22, and the heater size in a longitudinal direction of the slider is a thickness 23. A position of the heater 12 is expressed as a distance 24 between the center of the heater 12 and the air bearing surface (ABS). The center of the heater 12 is on a symmetry plane B-B' similar to the center of the coil 7 or the read element 9.

Figure 5:
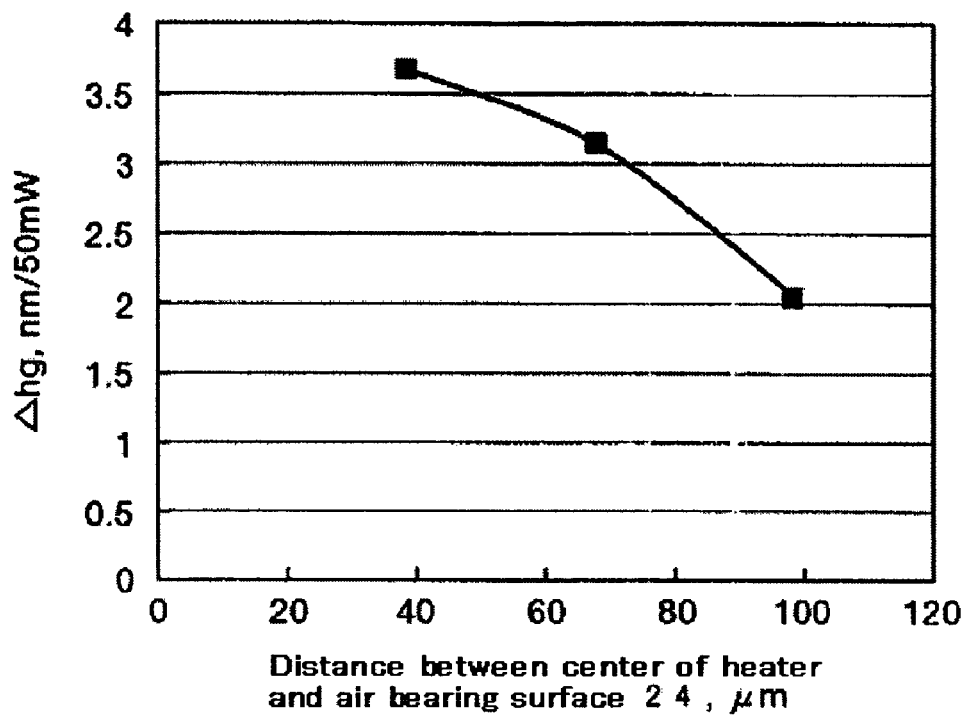
FIG. 5 is a graph showing a flying height variation per unit power consumption of a heater when a distance between the center of the heater and the air bearing surface is changed, in a magnetic head slider according to the first embodiment of the present invention.
Figure 6:
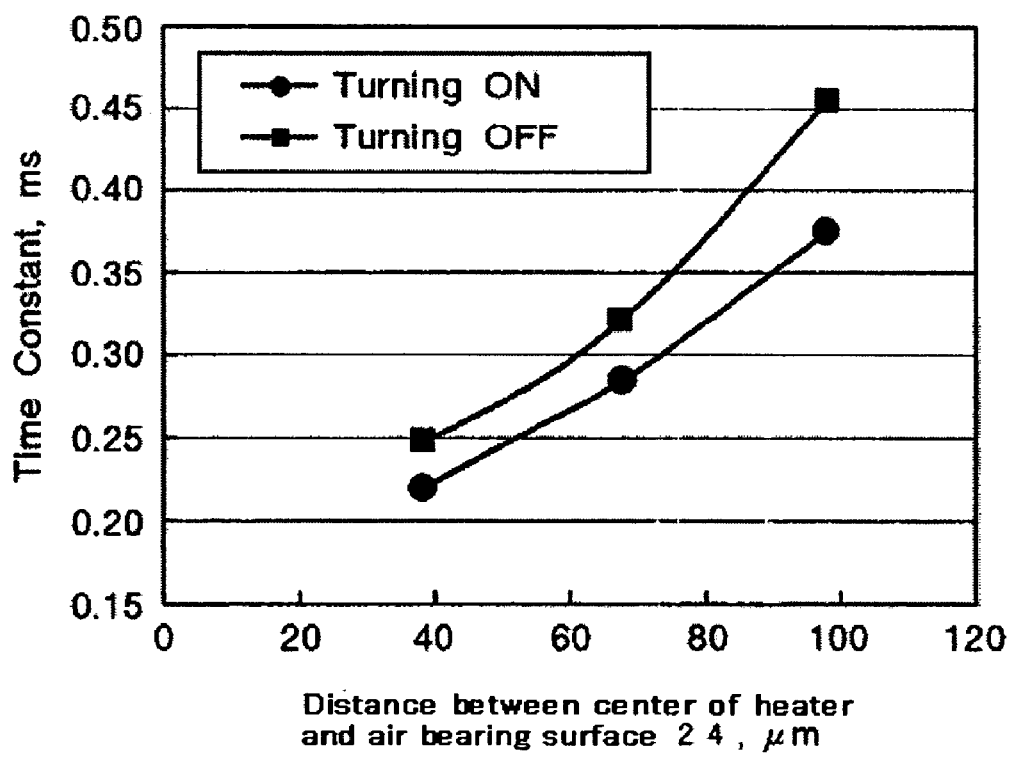
FIG. 6 is a graph showing a time constant of a flying height variation when a distance between the center of the heater and the air bearing surface is changed, in a magnetic head slider according to the first embodiment of the present invention.
Figure 7:
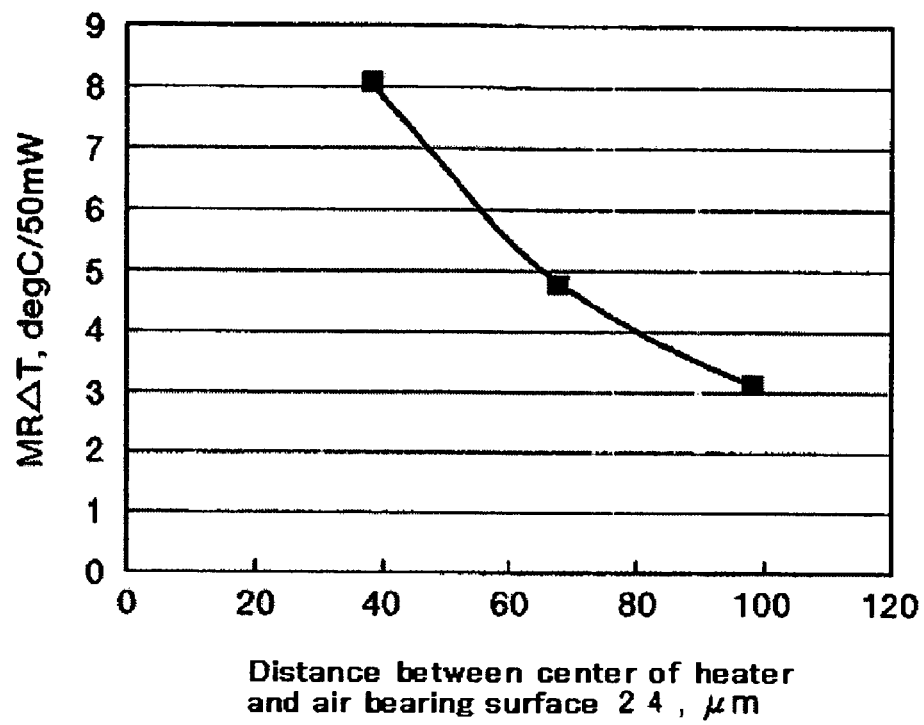
FIG. 7 is a graph showing a temperature rise in a read element per unit power consumption of a heater when a distance between the center of the heater and the air bearing surface is changed, in a magnetic head slider according to the first embodiment of the present invention.

Results of the study on the position of the heater 12 are shown in FIGS. 5, 6 and 7. Three kinds of experimental samples were studied wherein values of the distance 24 between the center of the heater 12 and the air bearing surface (ABS) was set at 38 μm, 68 μm and 98 μm, respectively, without changing a structure such as a size of the heater 12, a line width or gap of the resistance lines. FIG. 5 shows a gap flying height variation (Δhg) per unit power consumption of the heater 12, FIG. 6 shows a time constant of the flying height variation, and FIG. 7 shows a temperature rise (ΔT) of the read element (MR) 9.

As is apparent from FIG. 5, it is found that when the distance 24 between the center of the heater 12 and the air bearing surface (ABS) is reduced, the gap flying height variation (Δhg) per a heating value of 50 mW in the heater 12 is increased. In other words, as the heater 12 is moved closer to the air bearing surface (ABS), an electric power required to adjust the flying height is more reduced. As shown in FIG. 6, it is found that when the distance 24 between the center of the heater 12 and the air bearing surface (ABS) is reduced, the time constant of the flying height variation is reduced. On the other hand, as shown in FIG. 7, it is found that when the distance 24 between the center of the heater 12 and the air bearing surface (ABS) is reduced, the temperature rise (ΔT) per a heating value of 50 mW in the heater 12 is increased. That is, it is found that as the distance 24 between the center of the heater 12 and the air bearing surface (ABS) is more reduced, the characteristics as an actuator are further improved; however, a life of the read element 9 is shortened.

Figure 8:
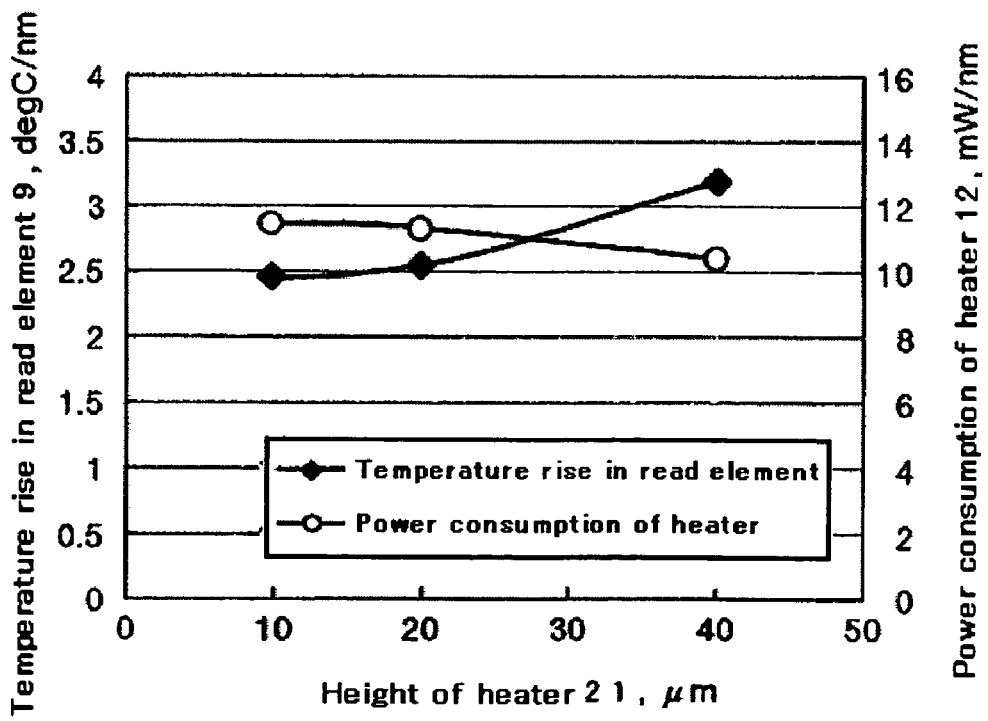
FIG. 8 is a graph showing a temperature rise in a read element and power consumption of the heater per unit flying height variation when a height of the heater is changed, in a magnetic head slider according to the first embodiment of the present invention.

Results of the study on the size of the heater 12 are shown. Simulation models were studied wherein the width 22 of the heater 12 is 20 µm, the thickness 23 of the heater 12 is 0.08 µm, the distance 24 between the center of the heater 12 and the air bearing surface (ABS) is 25 µm, and values of the height 21 of the heater 12 was set at 10 µm, 20 µm and 40 µm, respectively. FIG. 8 shows the temperature rise in the read element 9 per unit flying height variation and the power consumption of the heater 12 per unit flying height variation. From FIG. 8, it is found that as the height 21 of the heater 12 is reduced, the temperature rise in the read element 9 per unit flying height variation is reduced and the power consumption of the heater 12 per unit flying height variation is more increased. Studies were also made on simulation model in which the distance 24 between the center of the heater 12 and the air bearing surface (ABS) was changed. As a result, it is found that when the distance 24 between the center of the heater 12 and the air bearing surface (ABS) is reduced and further the height 21 of the heater 12 is reduced, the power consumption of the heater 12 per unit flying height variation can be reduced while controlling the temperature rise in the read element 9 per unit flying height variation.

Figure 9:
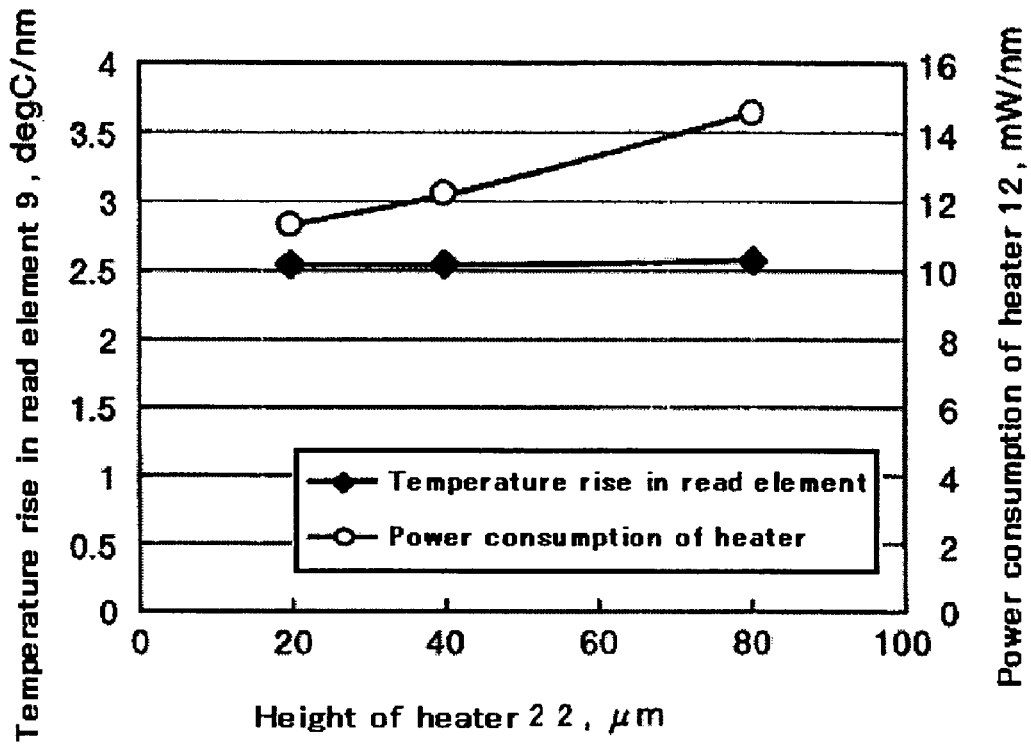
FIG. 9 is a graph showing a temperature rise in a read element and power consumption of a heater per unit flying height variation when a width of the heater is changed, in a magnetic head slider according to the first embodiment of the present invention.

Simulation models were studied wherein the height 21 of the heater 12 is 20 µm, the thickness 23 of the heater 12 is 0.08 µm, the distance 24 between the center of the heater 12 and the air bearing surface (ABS) is 25 µm, and values of the width 22 of the heater 12 was set at 20 µm, 40 µm and 80 µm, respectively. FIG. 9 shows the temperature rise in the read element 9 per unit flying height variation and the power consumption of the heater 12 per unit flying height variation. From FIG. 9, it is found that when the width 22 of the heater 12 is reduced, the temperature rise in the read element 9 per unit flying height variation is scarcely observed and the power consumption of the heater 12 per unit flying height variation is reduced.

As is apparent from the above-described results, the heater 12 is arranged between the lower shield 11 of the read element 9 and the slider 4, and the height 21 and width 22 of the heater 12 and the distance 24 between the center of the heater 12 and the air bearing surface (ABS) are reduced. As a result, the power consumption of the heater 12 and the response speed of the flying height adjustment can be improved and an influence that the heater has on the life of the read element 9 can be minimized.

Internal Construction of Magnetic Head Slider According to Second Embodiment

In the first embodiment, resistance of the heater 12 is made constant, and the height 21 and width 22 of the heater 12 are reduced in order to improve the performance as an actuator for controlling the flying height. In this case, a cross-sectional area in the resistance lines of the heater 12 is reduced and as a result, breaking of wires is easily caused by fusion due to heat generation or by migration due to current and stress. That is, the smaller size and the reliability of the heater 12 have relationships opposite to each other. Therefore, it is important to make the heater 12 that provides both an adequate actuator performance and reliability.

Figure 10:
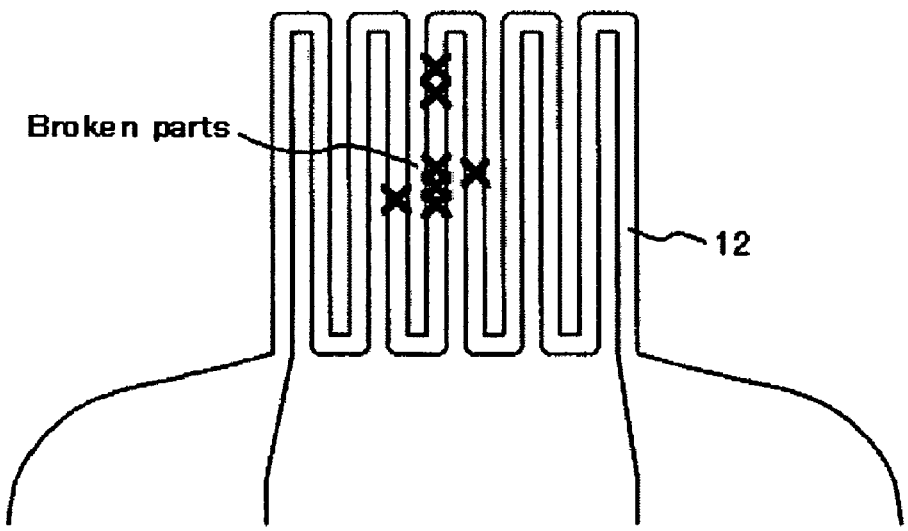
FIG. 10 is a view showing broken parts in a heater when supplying to the heater such power that the wire is broken, in a magnetic head slider according to the first embodiment of the present invention.
Figure 1:
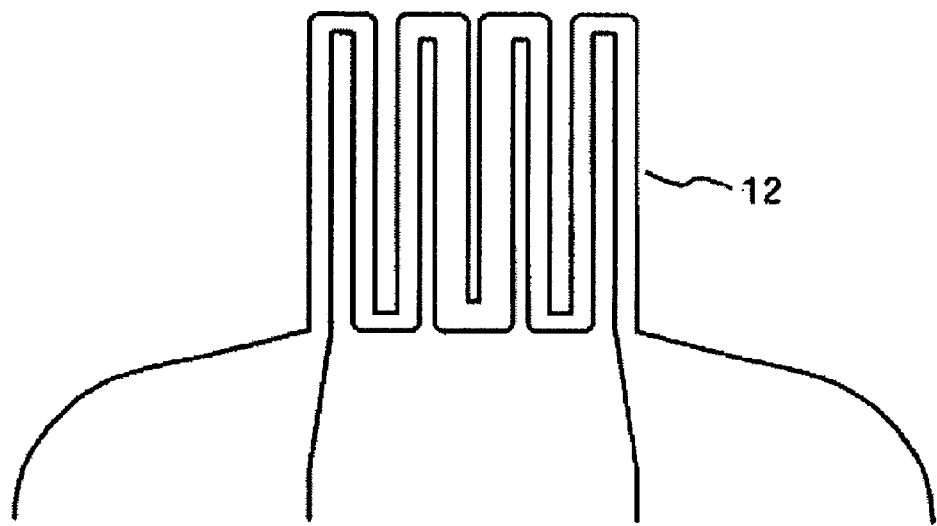
Figure 1:
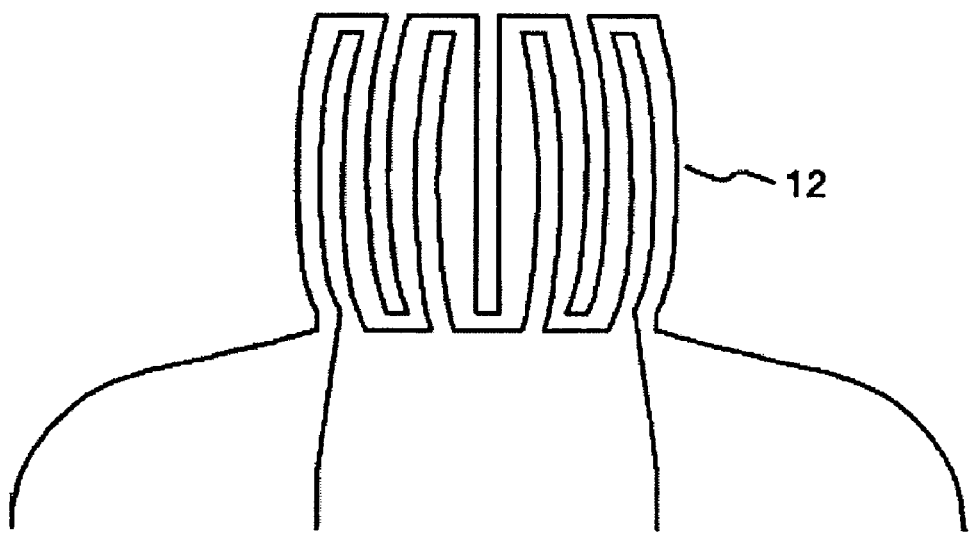
Figure 1:
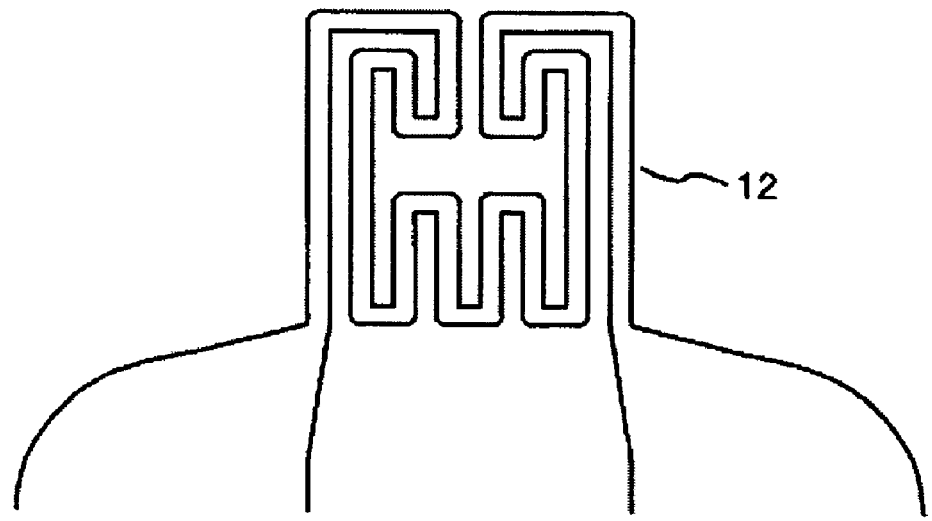
Figure 1:
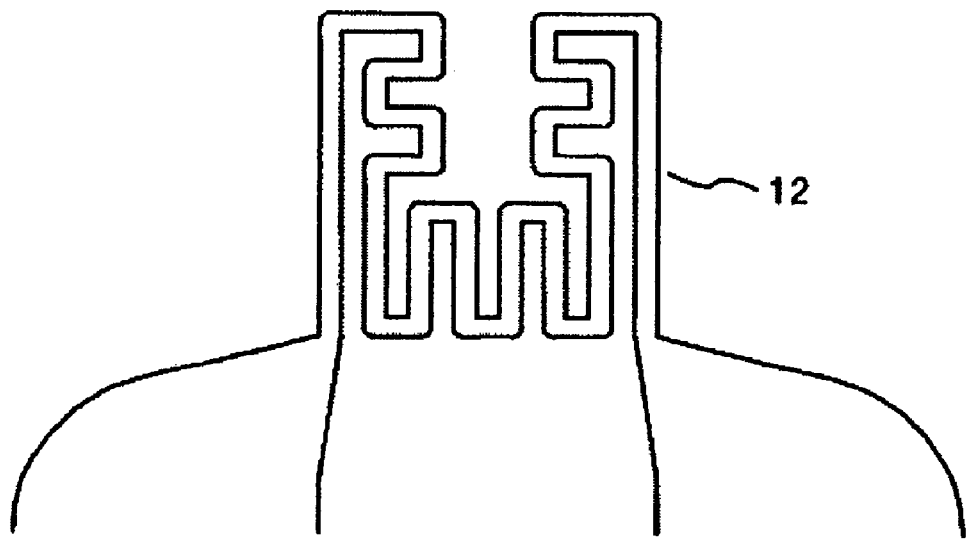

It is also found that deviation of a temperature distribution exists within the heater. In FIG. 10, "X" marks indicate broken parts in the heater 12, which are caused by supplying to the heater 12 such great power that wires are broken. The broken parts are concentrated in the central part of the heater 12 and are unevenly distributed. In view of these facts, it is found that the deviation of the temperature distribution actually exists within the heater 12. This is because the thermal conductivity of alumina 3 filling around the heater 12 or embedded in the gap between the resistance lines is about one several tenth as large as that of the heater 12, the thermal conduction within the heater 12 is prevented and thereby the heater tends to store heat therein. Accordingly, when the deviation of the temperature distribution exists within the heater 12 and a part of the heater 12 has a high temperature, the reliability of the part locally having a high temperature is remarkably deteriorated. As a result, the reliability of the whole heater 12 is deteriorated as compared with a case where the temperature distribution within the heater is uniform.

Figure 3:
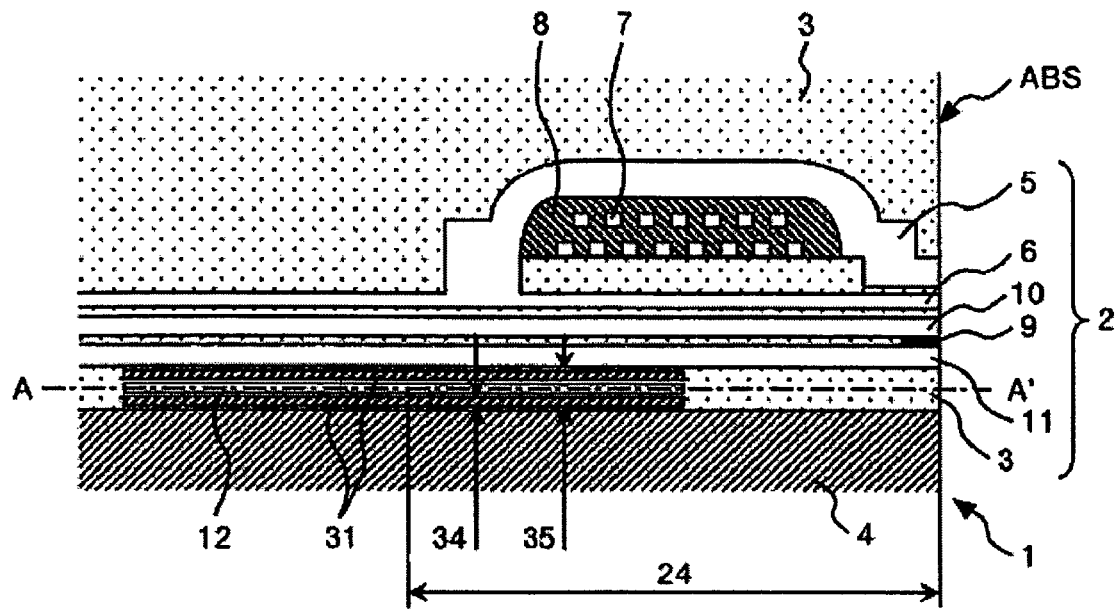
FIG. 3 is a cross-sectional view near a read/write element of a magnetic head slider according to a second embodiment of the present invention.
Figure 4:
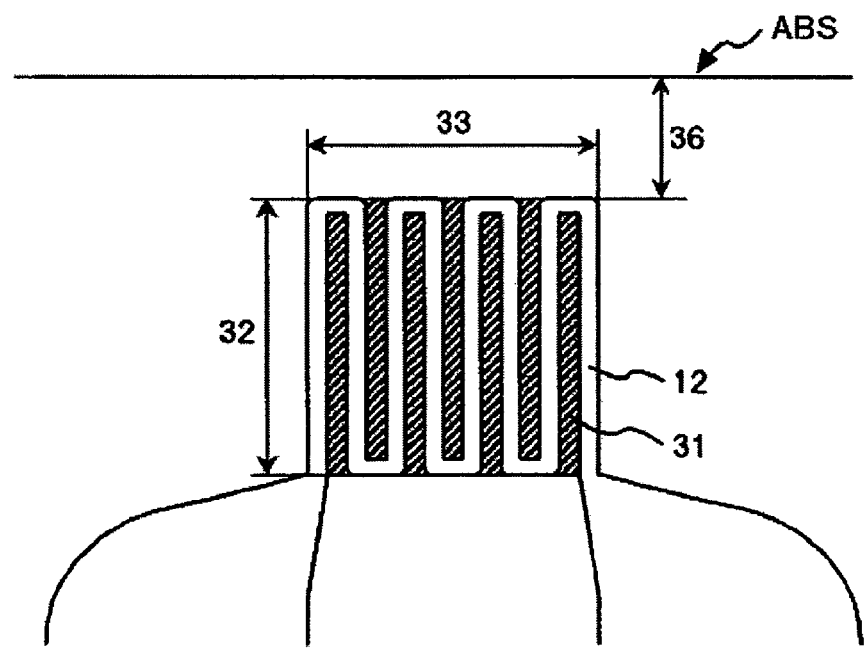
FIG. 4 is a cross-sectional view taken along the line A-A' in FIG. 3.

Therefore, the second embodiment represents an improvement over the first embodiment and high reliability of the heater is also realized. A schematic construction of a magnetic head slider according to the second embodiment is shown in FIGS. 3 and 4. FIG. 3 is a cross-sectional view (equivalent to a cross-sectional view taken along the line C-C' in FIG. 16) near a read/write element, which is viewed from a slider side surface side, of the magnetic head slider having a heater according to the present embodiment. FIG. 4 is a cross-sectional view taken along the line A-A', which is viewed from the slider air flowing-out end side. This magnetic head slider has the same read/write element 2 and heater 12 as in the magnetic head slider 1 shown in FIG. 1. As shown in FIG. 3, the read/write element 2 is formed near the air bearing surface (ABS) of an element forming surface (air flowing-out end face) of the Al—TiC slider 4, and the circumference of the read/write element 2 is filled with alumina 3.

The read/write element 2 includes a write element for performing writing. The write element has an upper magnetic pole piece 5, a lower magnetic pole piece 6, a coil 7, and resist 8 filling around the coil 7. The read/write element 2 also includes read element (MR) 9 for performing reading, and an upper shield 10 and lower shield 11 for protecting the read element 9 from an external magnetic field. The heater 12 for adjusting the flying height is provided near the read/write element 2. The heater 12 between the lower shield 11 and the slider 4 has a structure that the resistance lines are alternately extended in the same manner as in FIG. 2. A size of the heater (resistor) 12 is expressed such that the heater size in a thickness direction of the slider is a height 21, the heater size in a width direction of the slider is a width 22, and the heater size in a longitudinal direction of the slider is a thickness 23. A position of the heater 12 is expressed as a distance 24 between the center of the heater 12 and the air bearing surface (ABS). The center of the heater 12 is on a symmetry plane B-B' similar to a center of the coil 7 or the read element 9.

An important feature of the present embodiment is that a film (temperature gradient relaxing material) 31 composed of a material having a thermal conductivity higher than that of alumina 3 is formed near the heater 12. In the present embodiment, the heater 12 in alumina 3 is sandwiched between two temperature gradient relaxing materials 31. A certain level of a gap is left between the heater 12 and the temperature gradient relaxing material 31 to obtain an adequate insulating resistance. As shown in FIGS. 3 and 4, a size of the temperature gradient relaxing material 31 sandwiching the heater 12 is expressed such that the size in a thickness direction of the slider is a height 32, the size in a width direction of the slider is a width 33, and the size in a longitudinal direction of the slider is a thickness 34. The size of a combination of the heater 12 and the temperature gradient relaxing material 31 in a longitudinal direction of the slider is expressed as a pseudo-thickness 35 of the heater.

A gap between the heater 12 and the temperature gradient relaxing material 31 is preferably from about 0.01 to 2 µm in view of the insulating resistance and thermal conductivity between the heater 12 and the temperature gradient relaxing material 31. In order to obtain an effect of relaxing the temperature gradient, a surface area of the heater 12 contacting the temperature gradient relaxing material 31 through an insulation medium is desirably about 30% or more of the total surface area of the heater 12. Each temperature gradient relaxing material 31 is formed to contact a high-temperature part of the heater 12 through the insulation medium as well as to contact with a low-temperature part of the heater 12 through the insulation medium. If the temperature gradient relaxing material 31 is extended to the air bearing surface (ABS), it may act as a heat sink which increases the amount of heat dissipation to the magnetic disk. Therefore, a distance between the temperature gradient relaxing material 31 and the air bearing surface (ABS) is desirably about 3 μm or more. In the present embodiment, the insulation medium is alumina; however, a material having a thermal conductivity higher than that of alumina may also be used for the insulation medium.

Insulating materials may also be used for the temperature gradient relaxing material 31. In that case, it is desirable that the gap between the heater 12 and the temperature gradient relaxing material 31 be eliminated or the temperature gradient relaxing material 31 be formed also in the gap between the resistance lines, in order to increase a transfer heat quantity between the heater 12 and the temperature gradient relaxing material 31.

The temperature gradient of the heater 12 is relaxed by the temperature gradient relaxing material 31. At the same time, the temperature gradient relaxing material 31 also is subjected to a temperature rise approximately equal to that of the heater 12 and therefore, the material 31 acts as a part of the heater 12. For this reason, not the thickness 23 of the heater 12 but the pseudo-thickness 35 of the heater is treated as the heater thickness which affects thermal deformation. Therefore, the thickness of the heater 12 is apparently larger than the actual thickness 23 of the heater. However, from the analysis results, it is found that even if the thickness of the heater 12 is increased to several times the actual thickness 23 of the heater, the power consumption, the response speed for changing the flying height or the temperature rise in the read element is scarcely affected. However, in the present embodiment, the heater 12 and the temperature gradient relaxing material 31 are formed between the lower shield 11 and the slider 4. Therefore, when the temperature gradient relaxing material 31 is made thicker, a distance between the lower shield 11 and the slider 4 is increased. When the distance between the lower shield 11 and the slider 4 is increased, a local protrusion of the air bearing surface (ABS), which is called thermal protrusion, caused by heat generation of the coil 7 is made larger. As a result, reduction in the flying height is prevented. Accordingly, the thickness 34 of the temperature gradient relaxing material 31 is desirably adjusted to about five times or less the thickness 23 of the heater 12.

In the present embodiment, two temperature gradient relaxing materials 31 are formed so as to sandwich the heater 12 therebetween. The position, the shape and the number of the materials 31 are not restricted. Accordingly, the height 32 and width 33 of the temperature gradient relaxing material 31 may be larger or smaller than the height 21 and width 22 of the heater 12. The temperature gradient relaxing material 31 may be formed only on one side of the heater 12, or a plurality of the temperature gradient relaxing materials 31 may be formed. The shape of the materials 31 is not necessarily a square shape and may be a free or arbitrary shape in response to the temperature distribution within the heater.

When a material having a coefficient of thermal expansion smaller than that of alumina 3 or a material having a Young's modulus larger than that of the material of the heater 12 is selected for the material of the temperature gradient relaxing material 31, deformation of the heater 12 accompanied by thermal deformation near the read/write element 2 can be reduced. By suppressing the deformation of the heater 12, fatigue breakage of the heater due to repeated deformation or breaking of wires due to stress migration can be prevented.

Depending on the material for use in the heater 12, layers of the barrier metals such as tungsten or titanium are used for a lower layer, an upper layer or an upper and lower layer of the heater wiring to form a laminated wiring. By doing so, improvement in resistance to electromigration or stress migration may be attempted.

As described above, in the slider according to the present embodiment, a heat exchange between a high-temperature part and low-temperature part of the heater 12 is mainly performed through the temperature gradient relaxing material 31 having an adequate cross-sectional area and a thermal conductivity larger than that of alumina 3 in addition to the resistance lines having a small cross-sectional area or the alumina 3 having a small thermal conductivity. Therefore, a temperature difference between the high-temperature part and low-temperature part of the heater 12 is reduced and the temperature gradient is relaxed as compared with a case where the temperature gradient relaxing material 31 is not used. Thus, a heat concentration is eliminated and as a result, the reliability of the whole heater 12 is improved.

Heater Construction According to Third Embodiment

A construction of a heater according to a third embodiment of the present invention is shown in FIGS. 11 and 12. An entire construction and read/write element structure of a magnetic head slider, and an arrangement of the heater are the same as in the first and second embodiments. FIGS. 11 and 12 each show the heater 12 viewed from a slider air flowing-out end side. The thickness 23 of the heater 12 is constant.

An important feature of the third embodiment is that a cross-sectional area of the resistance lines near the central part having the highest temperature within the heater 12 is made larger so as to keep the heater 12 at a constant or approximately constant temperature. In an example shown in FIG. 11, a line width of the resistance lines is changed at every turn of the lines and is increased toward the center. That is, resistance per unit length is reduced toward the central part. In an example shown in FIG. 12, the line width of the resistance lines is changed at any time and is made thicker toward the central part.

In the present embodiment, the cross-sectional area of the resistance lines near the central part having the highest temperature within the heater 12 is made larger. Further, a line gap between the resistance lines near the center of the heater 12 may be made larger so as to realize a constant or approximately constant temperature distribution within the heater 12.

In the present embodiment, the thickness 23 of the heater 12 is made constant; however, the height 21 and width 22 of the heater are increased as compared with those of the heater shown in FIG. 2. Accordingly, it is considered that the performance of adjusting the flying height is affected. For this reason, the cross-sectional area of a part having a high temperature may be made larger by adjusting the thickness of the heater.

In the present embodiment, a part having the highest temperature within the heater 12 is the central part of the heater 12. However, thermal distributions of the read/write element 2 and the heater 12 are greatly affected by the element structure and therefore, the highest temperature part of the heater 12 is not necessarily the central part. Therefore, it is desirable that a line cross-sectional area or line gap of the resistance lines be adjusted in response to the temperature distribution within the heater 12.

In the present embodiment, the line cross-sectional area of the heater 12 is determined so as to keep the heater 12 at a constant or approximately constant temperature. However, the cross-sectional area may be determined in view of improvement in heat resistance due to the increased line cross-sectional area or improvement in electromigration resistance due to decrease of a current density. In such a case, the Arrenius equation commonly used in a reaction kinetics model may be used. More specifically, the line cross-sectional area of the heater 12 may be determined such that K in the equation $K=AJ^{-n} \exp(-Ea/(kT))$ becomes constant, wherein A is a constant, J is a current density, n is a constant for current (usually 2), Ea is an activation energy, k is the Boltzmann constant, and T is an absolute temperature.

As described above, in the magnetic head slider according to the present embodiment, the cross-sectional area in the resistance line of the heater 12 is increased toward the central part while a small resistance is attained and therefore, a heating value per unit length is reduced. Accordingly, the temperature within the heater 12 becomes constant or approximately constant, and a thermal concentration is eliminated, whereby the reliability of the heater 12 is improved.

Heater Construction According to Fourth Embodiment

A heater construction according to a fourth embodiment is shown in FIGS. 13 and 14. FIG. 13 shows the heater 12 viewed from a slider air flowing-out end side, in which the resistance lines are wired away from the vicinity of the heater central part. FIG. 14 shows the heater 12 viewed from a slider air flowing-out end side, in which the resistance lines are wired away from the vicinity of the heater central part and of the read element. A read/write element structure of the slider and an arrangement of the heater are the same as in the magnetic head slider shown in FIG. 1.

An important feature of the fourth embodiment is that in the case of forming wiring of the resistance lines on the whole surface, the resistance lines are wired away from a part having the highest temperature within the heater 12. In an example shown in FIG. 13, the resistance lines are wired away from the vicinity of the heater central part having a high temperature. In this example, an additional effect of relaxing a temperature gradient within the heater can be obtained due to no heat generation in the central part of the heater.

Further, as shown in FIG. 14, the resistance lines may be wired away from the vicinity of the heater central part and the vicinity of the read element, in order to suppress the temperature rise of the read element.

In the present embodiment, a part having the highest temperature within the heater 12 is the central part of the heater 12. However, thermal distributions of the read/write element 2 and the heater 12 are greatly affected by the element structure and therefore, the high-temperature part of the heater 12 is not necessarily the central part. Therefore, it is desirable that a wiring position be adjusted in response to the temperature distribution within the heater 12.

In the present embodiment, only one heater is formed; however, a plurality of heaters may be combined.

As described above, in the slider according to the present embodiment, the resistance lines are wired away from the heater central part where reliability is reduced due to a thermal concentration, so that the reliability of the whole heater 12 can be improved. Further, the resistance lines are wired away from the vicinity of the read element, so that temperature rise of the read element 9 can be suppressed, and reliability of the read element 9 can be ensured.

In the thin film structure for heating or the heater according to the embodiments of the present invention, when the flying height is adjusted by applying power to the heater provided on the magnetic head slider, deviation of a temperature distribution within the heater is eliminated, or reliability at a high-temperature part within the heater is elevated. Therefore, the magnetic head slider having the thin film structure for heating or the heater capable of realizing almost the same reliability at each part of the heater can be provided.

Further, the magnetic disk drive equipped with the magnetic head slider can be provided where almost the same reliability is realized at each part of the heater and therefore the reliability of the whole heater is improved.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic head slider including:
   a slider;
   a read/write element having a read element and a write element stacked on an element forming surface of said slider; and
   a heater provided horizontally above said slider and horizontally below said read/write element through an insulating material such that a front end of said heater closest to the air bearing surface is located away from an air bearing surface and rearwardly of the read element of said read/write element; and
   a film composed of a material having a thermal conductivity higher than a thermal conductivity of said insulating material provided near said heater;
   wherein said film is an insulator.

2. The magnetic head slider according to claim 1, wherein said film is provided on either a lower part or upper part of said heater.

3. The magnetic head slider according to claim 1, wherein said film is provided on both surfaces of said heater.

4. The magnetic head slider according to claim 1, wherein said film has a coefficient of thermal expansion smaller than a coefficient of thermal expansion of said insulating material and has a Young's modulus larger than a Young's modulus of said heater.

5. The magnetic head slider according to claim 1, wherein a barrier layer composed of tungsten or titanium is provided on at least one of the upper part and lower part of said heater.

6. A magnetic head slider including:
   a slider;
   a read/write element having a read element and a write element stacked on an element forming surface of said slider; and
   a heater provided horizontally above said slider and horizontally below said read/write element through an insulating material, wherein resistance lines are alternately extended such that a front portion of the resistance lines closest to the air bearing surface is located away from an air bearing surface and rearwardly of the read element of said read/write element and such that a cross-sectional area in a central part of the resistance lines is larger than a cross-sectional area in a peripheral part thereof.

7. The magnetic head slider according to claim 6, wherein a line width of said resistance lines is wider in the central part of the resistance lines than in the peripheral part.

8. The magnetic head slider according to claim 6, wherein a thickness of said resistance lines is larger in the central part of the resistance lines than in the peripheral part.

9. A magnetic head slider including:
a slider;
a read/write element having a read element and a write element stacked on an element forming surface of said slider; and
a heater provided horizontally above said slider and horizontally below said read/write element through an insulating material, wherein resistance lines are alternately extended such that a front portion of the resistance lines closest to the air bearing surface is located away from an air bearing surface and rearwardly of the read element of said read/write element and such that a gap between the resistance lines is larger in a central part of the resistance lines than in a peripheral part thereof.

10. A magnetic head slider including:
a slider;
a read/write element having a read element and a write element stacked on an element forming surface of said slider; and
a heater provided horizontally above said slider and horizontally below said read/write element through an insulating material, wherein resistance lines are alternately extended such that a front portion of the resistance lines closest to the air bearing surface is located away from an air bearing surface and rearwardly of the read element of said read/write element and such that contact with a part having the highest temperature is avoided.

11. The magnetic head slider according to claim 10, wherein said resistance lines are wired on a part other than a central part of said heater.

12. The magnetic head slider according to claim 10, wherein said resistance lines are wired on a part other than a central part of said heater and a part other than a vicinity of said read element.

13. A magnetic disk drive comprising:
a magnetic disk;
a spindle motor that rotates said magnetic disk while holding said magnetic disk on a rotating shaft;
a magnetic head slider that reads and writes information on said magnetic disk;
a suspension that supports said magnetic head slider; and
a drive unit that moves said suspension in a radial direction of said magnetic disk;
wherein said magnetic head slider includes:
a slider;
a read/write element having a read element and a write element stacked on an element forming surface of said slider; and
a heater provided horizontally above said slider and horizontally below said read/write element through an insulating material such that a front end of said heater closest to the air bearing surface is located away from an air bearing surface and rearwardly of the read element of said read/write element.

14. A magnetic disk drive comprising:
a magnetic disk;
a spindle motor that rotates said magnetic disk while holding it on a rotating shaft;
a magnetic head slider that reads and writes information on said magnetic disk;
a suspension that supports said magnetic head slider; and
a drive unit that moves said suspension to a radial direction of said magnetic disk;
wherein said magnetic head slider includes:
a slider;
a read/write element having a read element and a write element stacked on an element forming surface of said slider;
a heater provided horizontally above said slider and horizontally below and said read/write element through an insulating material such that a front end of said heater closest to the air bearing surface is located away from an air bearing surface and rearwardly of the read element of said read/write element; and
a film composed of a material having a thermal conductivity higher than a thermal conductivity of said insulating material provided near said heater.

15. A magnetic disk drive comprising:
a magnetic disk;
a spindle motor that rotates said magnetic disk while holding it on a rotating shaft;
a magnetic head slider that reads and writes information on said magnetic disk;
a suspension that supports said magnetic head slider; and
a drive unit that moves said suspension to a radial direction of said magnetic disk;
wherein said magnetic head slider includes:
a slider;
a read/write element having a read element and a write element stacked on an element forming surface of said slider; and
a heater provided horizontally above said slider and horizontally below said read/write element through an insulating material, wherein resistance lines are alternately extended such that a front portion of the resistance lines closest to the air bearing surface is located away from an air bearing surface and rearwardly of the read element of said read/write element and such that a cross-sectional area in a central part of the resistance lines is larger than a cross-sectional area in the peripheral part thereof.

16. A magnetic disk drive comprising:
a magnetic disk;
a spindle motor that rotates said magnetic disk while holding it on a rotating shaft;
a magnetic head slider that reads and writes information on said magnetic disk;
a suspension that supports said magnetic head slider; and
a drive unit that moves said suspension to a radial direction of said magnetic disk;
wherein said magnetic head slider includes:
a slider;
a read/write element having a read element and a write element stacked on an element forming surface of said slider; and
a heater provided horizontally above said slider and horizontally below said read/write element through an insulating material, wherein resistance lines are alternately extended such that a front portion of the resistance lines closest to the air bearing surface is located away from an air bearing surface and rearwardly of the read element of said read/write element and such that a gap between the resistance lines is larger in a central part of the resistance lines than in a peripheral part thereof.

17. A magnetic disk drive comprising:
a magnetic disk;
a spindle motor that rotates said magnetic disk while holding it on a rotating shaft;
a magnetic head slider that reads and writes information on said magnetic disk;
a suspension that supports said magnetic head slider; and
a drive unit that moves said suspension to a radial direction of said magnetic disk;
wherein said magnetic head slider includes:
a slider;
a read/write element having a read element and a write element stacked on an element forming surface of said slider; and
a heater provided horizontally above said slider and horizontally below said read/write element through an insulating material, wherein resistance lines are alternately extended such that a front portion of the resistance lines closest to the air bearing surface is located away from an air bearing surface and rearwardly of the read element of said read/write element and such that contact with a part having the highest temperature is avoided.

* * * * *